July 17, 1962 A. J. BULLOCK, JR 3,045,228
MAGNETIC CORE STORAGE DEVICE
Filed Dec. 10, 1956
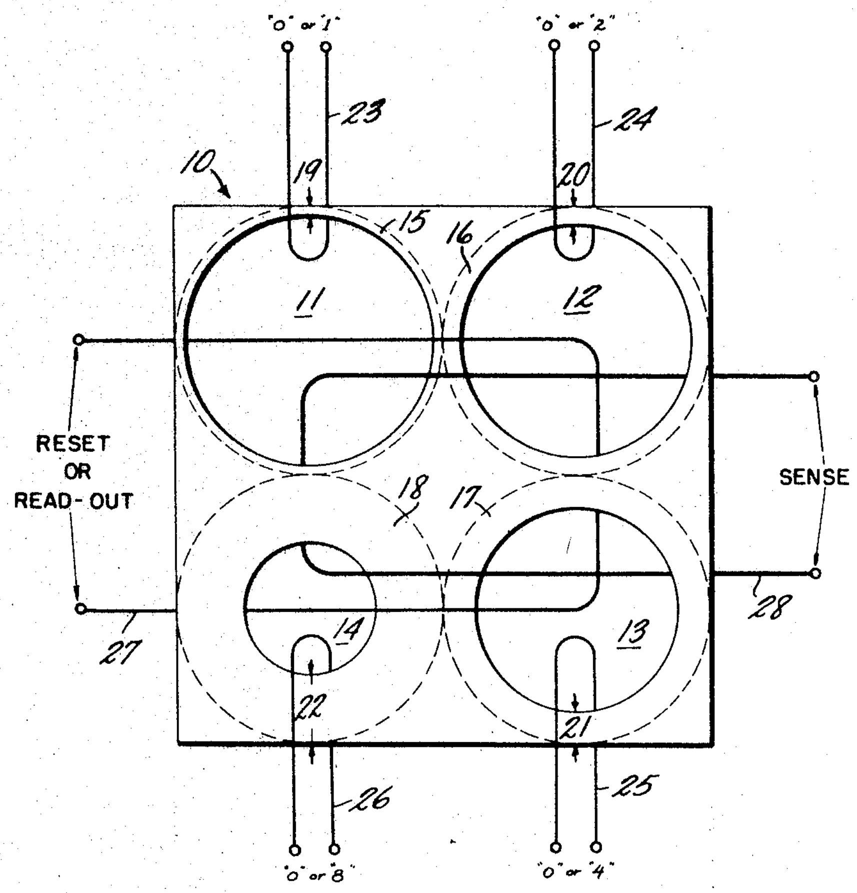
INVENTOR.
ANDREW J. BULLOCK, JR.
BY
Campbell, Brumbaugh, Free & Graves
his ATTORNEYS United States Patent Office 3,045,228

Patented July 17, 1962

3,045,228

MAGNETIC CORE STORAGE DEVICE

Andrew J. Bullock, Jr., Ithaca, N.Y., assignor to International Business Machines Corporation, New York, N.Y., a corporation of New York Filed Dec. 10, 1956, Ser. No. 627,246
11 Claims. (Cl. 340—347)

The present invention relates to magnetic core structures for storing and translating digital pulse information.

Opposite states of remanence in magnetic storage cores may be representative of binary digital information. These states are established and controlled by current pulses applied to windings on such storage cores. A core magnetized in a particular remanence state may arbitrarily represent a "zero" while a core magnetized in the opposite state represents a "one."

Bits of information read individually into diverse storage cores often must be combined after read-out in various computer circuits. The separate read-out and other circuits required add greatly to the complexity and expense of magnetic core registers.

Accordingly, it is an object of the present invention to provide a core storage device producing an output representative of individual bits of information stored therein.

It is another object of the invention to provide a plurality of information bearing magnetic storage cores furnishing an analog quantity representative of diverse bits of information received sequentially or simultaneously.

These and further objects of the invention are accomplished by providing a plurality of magnetic cores carrying individual and common windings. If a number of the cores while in one remanence state are switched to their opposite remanence state, a voltage pulse will be produced in the common winding representative of flux changes in all of the cores switched. Therefore, bits of information individually read into selected cores may be read out simultaneously to provide an analog quantity representative of the stored information.

In one embodiment of the invention a series of magnetic cores are formed with related cross-sectional areas such, for example, that the area of each sucessive core is twice that of the preceding core. Since the maximum voltage developed in a winding is directly proportional to the flux linking it and the total flux depends on the core cross-sectional area, the cores may be selected to provide in combination output pulses representative of a variety of quantities.

For a better understanding of these and other objects and advantages of the present invention, reference may be had to the following description in connection with the single FIGURE in the drawing which illustrates a schematic diagram of an embodiment of the present invention.

Referring to the drawing in greater detail, a member 10 illustrated as a square magnetic plate, formed with a thickness dependent upon magnetic flux path requirements, is provided with four apertures 11, 12, 13 and 14 having, in this instance, differing diameters. By appropriately positioning the apertures, four independent magnetic circuits effectively form magnetic cores 15, 16, 17 and 18 defined by broken lines on the drawing. It will be apparent that the cross-sectional area of each core is determined by dimension 19, 20, 21 and 22, respectively, between the inner peripheries of the cores and the edges of the plate 10.

The magnetic material forming the cores 15 to 18 must be capable of assuming opposite stable remanence states and preferably exhibits a square-loop hysteresis characteristic in which the residual flux density is a large portion of the saturation flux density, the square knees in such a hysteresis loop being indicative of a well-defined threshold coercive force. When a core formed of this material is magnetized in one direction, a flux reversal resulting from its being switched to the opposite remanence state by the application of a suitable magneto-motive force (m.m.f.) induces a voltage pulse in any windings inductively linking it.

The magnetic cores provided by the plate 10 carry a number of windings which have been diagrammatically illustrated in the drawing in the interests of clarity. Thus, read-in windings 23, 24, 25 and 26 are mounted in inductive relation with the cores 15, 16, 17 and 18, respectively, while a reset or read-out winding 27 inductively links the four cores. Therefore, the latter winding may be excited by pulses to switch one or more of the magnetic cores from one to another remanence state, depending upon their condition, to provide an output voltage in a sensing winding 28, also inductively linking the four cores, the output voltage being representative of flux changes in the switched cores.

For the purposes of illustration, it will be assumed that the diameter of the aperture 12 is such that the cross-sectional area of the core 16 is twice the cross-sectional area of the core 15. Similarly, the cross-sectional area of the core 17 will be assumed to be twice that of the core 16, and the cross-sectional area of the core 18 twice that of the core 17.

From the foregoing it is evident that in the series of cores each successive core possesses a magnetic circuit having twice the total flux capacity of the immediately preceding core. Accordingly, the voltage pulses induced in the sensing winding 28 by a reversal of the remanence states of the various cores differ in magnitude so that they may be assigned selected quantities. As indicated on the drawing, the cores 15 to 18 produce pulses representing the quantities "one," "two," "four" and "eight," respectively.

Instead of using the punched plate as the magnetic member 10 to form the cores 15 to 18, the storage device may be formed, for example, of separate stacked toroids of appropriate cross-section carrying individual read-in windings and common reset and sensing windings.

Typical operations of the present invention will be apparent when the following exemplary cycles of the storage device are considered.

*Example I*

It will be assumed that a reset or read-out pulse in the winding 27 has just cleared the cores 15 to 18 so that they stand magnetized in the "zero" remanence state. Two bits of information representing "one" and "four" are then read into the digital-to-analog device by applying a pulse to the windings 23 and 25 which switches the cores 15 and 17, respectively, to their opposite remanence state. The cores 16 and 18 remain in the "zero" remanence state.

A subsequent reset or read-out pulse in the winding 27 fails to affect the cores 16 and 18 since they are already in the "zero" state. However, the remanence state of the cores 15 and 17 will be reversed by such pulse thereby inducing a voltage in the common winding 28 proportional to the flux in both the cores 15 and 17 linking the winding. In other words, the magnitude of the voltage induced in winding 28 will represent "five.",

*Example II*

After the read-out of the previously stored information set forth in Example I, each core of the digital-to-analog device stands in the zero remanence state ready for the next cycle of operation. If two bits of information representing "one" and "six" are to be read into the device, a pulse is applied to the windings 23, 24 and 25 to switch the cores 15, 16 and 17 so that they store a "one," "two" and "four," respectively.

A subsequent read-out pulse applied to the winding 27 does not affect the core 18 since it is already in the "zero" remanence state. However, the remanence state of the core members 15, 16 and 17 will be reversed, and the voltage induced in the common winding 28 will be of a magnitude proportional to the sum of the individual voltages induced by the flux reversal in these core members. In other words, the magnitude of the voltage induced in the winding 28 will represent "seven."

It will be understood that the above described embodiments of the invention are illustrative only and modifications thereof will occur to those skilled in the art. Therefore, the invention is not to be limited to the specific apparatus disclosed herein but is to be defined by the appended claims.

I claim:

1. A magnetic core storage device comprising a plurality of magnetic cores capable of assuming opposite stable remanence states, a like plurality of input windings of which each is carried by a respective one of said cores and of which each is selectively adapted indendently of the others to receive a pulse to switch the corresponding core from a first to the second one of said opposite remanence states, said input windings being thereby adapted to switch to said second state any combination of cores selectable from said plurality thereof, reset winding means inductively linking all of said cores and adapted to receive pulses to switch simultaneously all the cores then in said second state to said first state, and sensing winding means inductively linked to all of said cores by a corresponding plurality of flux linkages of which each is made between a respective one of said cores and said sensing winding means, said flux linkages being each different from the others in flux-turn value but all providing the same sense of turning of flux around said sensing winding means relative to a given current direction therein, whereby each flux linkage is adapted to induce voltage in the same current direction in said sensing winding means in response to a change from said second to said first state of the core associated with such flux linkage, and said sensing winding means being thereby rendered responsive to said simultaneously switching by said reset winding means of any combination of said cores to produce an output voltage representative of the arithmetic sum of the flux-turn values associated with the cores so switched by said reset winding means.

2. A magnetic core storage device comprising a member of magnetic material capable of assuming opposite stable remanence states, means defining a plurality of apertures in said member spaced from each other and from the edges of said member to form a like plurality of cores, a like plurality of input windings of which each is carried by a respective one of said cores and of which each is selectively adapted independently of the others to receive a pulse to switch the corresponding core from a first to the second one of said opposite remanence states, said input windings being thereby adapted to switch to said second state any combination of cores selectable from said plurality thereof, reset winding means inductively linking all of said cores and adapted to receive pulses to switch simultaneously all the cores then in said second state to said first state, and sensing winding means inductively linked to all of said cores by a corresponding plurality of flux linkages of which each is made between a respective one of said cores and said sensing winding means, said flux linkages being each different from the others in flux-turn value but all providing the same sense of turning of flux around said sensing winding means relative to a given current direction therein, whereby each flux linkage is adapted to induce voltage in the same current direction in said sensing winding means in response to a change from said second to said first state of the core associated with such flux linkage, and said sensing winding means being thereby rendered responsive to said simultaneous switching by said reset winding means of any combination of said cores to produce an output voltage representative of the arithmetic sum of the flux-turn values associated with the cores so switched by said reset winding means.

3. A magnetic core storage device comprising a member of magnetic material capable of assuming opposite stable remanence states, means defining a plurality of different diameter apertures in said member spaced from each other and from the edges of said member to form a like plurality of cores having different cross-sectional areas, a like plurality of input windings of which each is carried by a respective one of said cores and of which each is selectively adapted independently of the others to receive a pulse to switch the corresponding core from a first to the second one of said opposite remanence states, said input windings being thereby adapted to switch to said second state any combination of cores selectable from said plurality thereof, reset winding means inductively linking all of said cores and adapted to receive pulses to switch simultaneously all the cores then in said second state to said first state, and sensing winding means inductively linked to all of said cores by a corresponding plurality of flux linkages of which each is made between a respective one of said cores and said sensing winding means, said different cross sectional areas rendering said flux linkages each different from the others in flux-turn value, but said flux linkages all providing the same sense of turning of flux around said sensing winding means relative to given current direction therein, whereby each flux linkage is adapted to induce voltage in the same current direction in said sensing winding means in response to a change from said second to said first state of the core associated with such flux linkage, and said sensing winding means being thereby rendered responsive to said simultaneous switching by said reset winding means of any combination of said cores to produce an output voltage representative of the arithmetic sum of the flux-turn values associated with the cores so switched by said reset winding means.

4. A magnetic core storage device comprising a member of magnetic material capable of assuming opposite stable remanence states, means defining a plurality of apertures in said member spaced from each other and from the edges of said member to form a like plurality of cores in a series, the effective cross-sectional area of each successive core having a two to one ratio with the cross-sectional area of the preceding core in the series, a like plurality of input windings of which each is carried by a respective one of said cores and of which each is selectively adapted independently of the others to receive a pulse to switch the corresponding core from a first to the second one of said opposite remanence states, said input windings being thereby adapted to switch to said second state any combination of cores selectable from said plurality thereof, reset winding means inductively linking all of said cores and adapted to receive pulses to switch simultaneously all the cores then in said second state to said first state, and sensing winding means inductively linked to all of said cores by a corresponding plurality of flux linkages of which each is made between a respective one of said cores and said sensing winding means, each flux linkage associated with a successive core in said series being rendered by said two to one ratio to have a flux-turns value twice as great as that of the flux linkage associated with the preceding core in said series, but all said flux linkages providing the same sense of turning of flux around said sensing winding means relative to a given current direction therein, whereby each flux linkage is adapted to induce voltage in the same current direction in said sensing winding means in response to a change from said second to said first state of the core associated with said flux linkage, and said sensing winding means being thereby rendered responsive to said simultaneous switching by said reset winding means of any combination of said cores to produce an output voltage representative of the arithmetic sum of the flux-turn values associated with the cores so switched by said reset winding means.

5. A magnetic core storage device comprising a plate of magnetic material capable of assuming opposite stable remanence states, means defining a plurality of apertures in said plate spaced from each other and from the edges of the plate to form a like plurality of cores, a like plurality of input windings of which each is carried by a respective one of said cores and of which each is selectively adapted independently of the others to receive a pulse to switch the corresponding core from a first to the second one of said opposite remanence states, said input windings being thereby adapted to switch to said second state any combination of cores selectable from said plurality thereof, reset winding means linking all of said cores and adapted to receive pulses to switch simultaneously all the cores then in said second state to said first state, and sensing winding means inductively linked to all of said cores by a corresponding plurality of flux linkages of which each is made between a respective one of said cores and said sensing winding means, said flux linkages being each different from the others in flux-turn value but all providing the same direction of turning of flux around said sensing winding means relative to a given current direction therein, whereby each flux linkage is adapted to induce voltage in the same current direction in said sensing winding means in response to a change from said second to said first state of the core associated with such flux linkage, and said sensing winding means being thereby rendered responsive to said simultaneous switching by said reset winding means of any combination of said cores to produce an output voltage representative of the arithmetic sum of the flux-turn values associated with the cores so switched by said reset winding means.

6. A magnetic core storage device as defined in claim 5 in which the plate is rectangular and the cores have cross-sectional areas determined by the smallest distance between the apertures and the edges of the plate.

7. A magnetic core storage device as defined in claim 6 wherein the cores form a series in which the cross-sectional area of each successive core has a two to one ratio with the cross-sectional area of the preceding core in the series, and wherein there is a corresponding two to one ratio between the flux-turns value of the flux linkage associated with each such successive core in the series and the flux-turns value of the flux linkage associated with the preceding core in the series.

8. A structure for providing a plurality of magnetic cores for use in an information storage device comprising a plate of magnetic material capable of assuming opposite stable remanence states, and means defining in the plate a plurality of different diameter apertures to form a like plurality of magnetic cores of different cross-sectional areas determined by the spacing of the edges of the apertures from the edges of the plate.

9. A structure for providing a plurality of magnetic cores for use in an information storage device comprising a plate of magnetic material capable of assuming opposite stable remanence states, the plate having opposite edges arranged in substantially parallel relation, and means defining in the plate a plurality of apertures having progressively larger diameters, the centers of the apertures being equidistant from the centers of adjacent apertures and from the adjacent edges of the plate to form a like plurality of magnetic cores having different cross-sectional areas determined by the spacing of the edges of the apertures from the edges of the plate.

10. A magnetic storage device comprising, a series of magnetic cores capable of selectively assuming first and second opposite remanence states, a plurality of input windings of which each is inductively linked with a respective one of said cores and of which each is selectively adapted independently of the others to receive a pulse to switch the corresponding core from said first to said second remanence state, said input windings being thereby adapted to switch to said second state any combination of cores selectable from said plurality thereof, reset winding means inductively linking all of said cores and adapted to receive pulses to switch simultaneously all of the cores then in said second state to said first state, and sensing winding means inductively linked to all of said cores by a plurality of flux linkages of which each is made between a respective one of said cores and said sensing winding means and of which each flux linkage associated with a successive core in said series has a flux-turns value twice as great as that of the flux linkage associated with the preceding core of the series, said flux linkages all providing the same sense of turning of flux around said sensing winding means relative to a given current direction therein, whereby each flux linkage is adapted to induce voltage in the same current direction in said sensing winding means in response to a change from said second state to said first state of the core associated with such flux linkage, and said sensing winding means being thereby rendered responsive to said simultaneous switching by said reset winding means of any combination of said cores to produce an output voltage representative of the arithmetic sum of the flux-turn values associated with the cores so switched by said reset winding means.

11. A system comprising, a plurality of at least three magnetic cores of which each is capable of being switched from a first stable remanent state to a second remanent state, and of which all are adapted to be initially in said first state, read-in means to switch from said first state to said second state the cores in a selected one of different selectable combinations of cores in said plurality, said switching serving to read into said system a selected quantitative indication represented by the selected core combination, reset means operable for any one of such selectable combinations and upon the selected combination to switch the cores thereof simultaneously from said second state back to said first state to thereby reset said system, and output means including output terminals to convert the flux changes produced by the switching back of said last named cores into corresonding time-coincident, flux-induced signals of which each is electrically manifested in said output means in series-aiding relation with all the others to develop at said output terminals and as the arithmetic sum of all said signals an output signal whose magnitude is representative of said quantitative indication.

References Cited in the file of this patent

UNITED STATES PATENTS

| | | |
|---|---|---|
| 2,519,426 | Grant | Aug. 22, 1950 |
| 2,682,632 | Cohen | June 29, 1954 |
| 2,695,993 | Haynes | Nov. 30, 1954 |
| 2,732,542 | Minnick | Jan. 24, 1956 |
| 2,742,632 | Whitley | Apr. 17, 1956 |
| 2,784,391 | Rajchman | Mar. 5, 1957 |
| 2,805,408 | Hamilton | Sept. 3, 1957 |
| 2,818,556 | Lo | Dec. 31, 1957 |
| 2,870,433 | Simpson | Jan. 20, 1959 |

OTHER REFERENCES

"Edvac Progress Report #2," June 30, 1946, pages 4–22 to 4–23, Py–O–164 (FIG. 17C relied on).

"The Transfluxor" (Rajchman), Proceedings of the IRE, vol. 44, issue 3, pages 321–332, March 1956.